US012785527B2

(12) United States Patent
Kurz-Lin et al.

(10) Patent No.: US 12,785,527 B2
(45) Date of Patent: Nov. 3, 2026

(54) SHAFT GENERATOR FOR GENERATING POWER DURING A GENERATING PROCESS AND/OR FOR PROVIDING POWER DURING A MOTOR OPERATION

(71) Applicant: A+K ANTRIEBE GMBH, Wernigerode (DE)

(72) Inventors: Klaus Kurz-Lin, Kelkheim (DE); André Ramme, Wernigerode (DE); Mathias Kuhner, Anderbeck (DE)

(73) Assignee: A+K ANTRIEBE GMBH, Wernigerode (DE)

( * ) Notice: Subject to any disclaimer, the term of this patent is extended or adjusted under 35 U.S.C. 154(b) by 430 days.

(21) Appl. No.: 18/682,507

(22) PCT Filed: Jul. 19, 2022

(86) PCT No.: PCT/EP2022/070191
§ 371 (c)(1),
(2) Date: Feb. 9, 2024

(87) PCT Pub. No.: WO2023/016760
PCT Pub. Date: Feb. 16, 2023

(65) Prior Publication Data

US 2024/0364197 A1 Oct. 31, 2024

(30) Foreign Application Priority Data

Aug. 10, 2021 (DE) ..................... 10 2021 120 740.1

(51) Int. Cl.
*H02K 21/22* (2006.01)
*H02K 1/14* (2006.01)
(Continued)

(52) U.S. Cl.
CPC ............. *H02K 21/22* (2013.01); *H02K 1/146* (2013.01); *H02K 1/2791* (2022.01); *H02K 11/33* (2016.01);
(Continued)

(58) Field of Classification Search
CPC ............................... H02K 21/22; H02K 11/33
(Continued)

(56) References Cited

U.S. PATENT DOCUMENTS 3,422,295 A * 1/1969 Parker .................... H02K 15/16 310/154.07
5,402,028 A * 3/1995 Koeber .................. H02K 1/148 310/216.022
(Continued)

FOREIGN PATENT DOCUMENTS

CN 109586506 A 4/2019
DE 10040273 A1 2/2002
(Continued)

*Primary Examiner* — Alexander Talpalatski
(74) *Attorney, Agent, or Firm* — Dickinson Wright PLLC; Andrew D. Dorisio

(57) ABSTRACT

The invention relates to a shaft generator (01) for generating power during a generating process and/or for providing power during a motor operation, the shaft generator (01) comprising a stator (02) and a rotor (03), the rotor (03) being configured to be disposed around a shaft (04) of a drive unit, in particular bearing-free, and the stator (02) being configured to be disposed around the rotor (03). The shaft generator (01) comprises at least two frequency converters (08, 09), the stator (02) is separable into at least two stator segments (05, 06) and each of the at least two stator segments (05, 06) is assigned one of the at least two frequency converters (08, 09).

15 Claims, 5 Drawing Sheets

(51) Int. Cl.
*H02K 1/2791* (2022.01)
*H02K 11/33* (2016.01)

(52) U.S. Cl.
CPC ..... *H02K 2201/03* (2013.01); *H02K 2213/06* (2013.01); *H02K 2213/12* (2013.01)

(58) Field of Classification Search
USPC ..................................................... 310/156.55
See application file for complete search history.

(56) References Cited

U.S. PATENT DOCUMENTS

| | | | | |
|---|---|---|---|---|
| 5,990,590 | A * | 11/1999 | Roesel, Jr. | H02K 7/025 310/112 |
| 6,229,232 | B1 * | 5/2001 | Roth-Stielow | H02K 11/33 310/160 |
| 7,821,169 | B2 * | 10/2010 | Okazaki | H02K 21/24 310/156.36 |
| 10,916,975 | B2 * | 2/2021 | Yoon | H02K 3/325 |
| 2006/0103137 | A1 | 5/2006 | Wobben | |
| 2008/0069686 | A1 * | 3/2008 | Masaki | F04D 25/06 415/121.2 |
| 2009/0134735 | A1 * | 5/2009 | Yoshikawa | H02K 16/02 310/198 |

FOREIGN PATENT DOCUMENTS

| | | | |
|---|---|---|---|
| EP | 2685602 | A1 | 1/2014 |
| KR | 102067405 | B1 | 1/2020 |

* cited by examiner

SHAFT GENERATOR FOR GENERATING POWER DURING A GENERATING PROCESS AND/OR FOR PROVIDING POWER DURING A MOTOR OPERATION

TECHNICAL FIELD

The invention relates to a shaft generator for generating power during a generating process and/or for providing power during a motor operation, in particular for the use in ships, and to an energy-generation and/or drive system having a shaft generator and a drive unit having a shaft and a corresponding ship.

BACKGROUND

From the state of the art, electromagnetically driven shaft generators for generating power during a generating process and/or for providing power during a motor operation are generally known. Shaft generators are used in the shipping sector for power take in (PTI) and power take off (PTO), for example, i.e., they are operated either during a motor operation (PTI) and/or a generating process (PTO) depending on the required power. Preferably power units for providing (electric) power for the on-board system of the ship can be operated in PTI mode. An additional mechanical power for operating the ship is provided directly at the propeller shaft in this mode via the shaft generator, which then acts as a shaft motor. This, for example, allows an electrified boost operation when a ship enters a port or when maneuvering the ship in the port, without having to increase the combustion power of the main engine. In PTO mode, in contrast, preferably the power units of the ship (which are most commonly run with diesel oil) can be switched off. An electric power, which is required for operating the on-board system, can then be provided from the main engine emission-free by means of the shaft generator and, if required, by means of waste heat recovery. In this context, the main engine for operating the ship combusts heavy fuel oil, which is less expensive than the diesel oil used in the power units. The use of a shaft generator of this kind in PTI and/or PTO mode has the advantage that significant emission savings can be attained in comparison to a ship operated only on combustion engines; these emission savings having a positive effect on the environmental balance of the ship in question.

By means of the shaft generator, an operating power is electromagnetically tapped directly or indirectly (i.e., via an interconnected gear system) from a propeller shaft of a ship propeller or from a main engine (such as a diesel motor) of the ship and is used for energy generation (PTO mode). In particular, it is known for shaft generators to be directly incorporated in a shafting of the propeller shaft or to be integrated therein, meaning the rotor shaft of the shaft generator coincides with the propeller shaft. In other words the rotor of the shaft generator is made in one piece and is disposed directly on the propeller shaft. Given the commonly large dimensions of a propeller shaft, e.g., in the range of 40 meters or more, a rotor has to be connected with the shaft in the course of its production before the propeller shaft is installed in a corresponding ship in order to dispose the rotor on the propeller shaft in this manner.

A disadvantage of this construction type is that retrofitting existing ships which do not yet have a shaft generator is not possible, as constructive circumstances and large dimensions of the components make it impossible to retrofit a propeller shaft on the ship. Consequently, existing ships cannot be retrofitted with sufficient flexibility.

To at least partially overcome this disadvantage, shaft generators can also be indirectly coupled with the propeller shaft of a ship via a gear system, for example, the rotor shaft of the shaft generator being engaged with the propeller shaft via one or more gear steps in a case such as this. This approach in turn, however, bears the disadvantage of additional installation space for providing a gear system or the like having to be available, the shaft generator thus not being able to be designed compactly.

In particular owing to increasing global pressure in all industrial sectors to minimize emissions resulting from the combustion of fossil fuels (such as heavy fuel oil and diesel oil) as much as possible, it is desirable for the shipping sector as the motor of global trade to provide an option for operation at lower emissions by means of a shaft generator as a solution which is also fit for retrofitting in order to be able to exploit a maximum service life of existing ships, on the one hand, and to meet demanded emission protection targets, on the other hand.

Another disadvantage of existing shaft generators is yielded by a shaft generator being able to pose a fire hazard should a fault occur or at least being able to cause an undesired braking of the ship. Thus, it is possible upon a short circuit of one of the stator windings, for example, that a resulting short-circuit current breaks through an insulation of the stator windings while the propeller shaft continues to rotate and/or the short-circuit current flows into other electric and/or electronic components of the shaft generator and causes a fire hazard there. It is also possible that an undesired braking moment acts on the propeller shaft as a result of a defect in the stator and/or rotor of the shaft generator. The mentioned fault instances are to be generally avoided, as a fire can be the cause of a shipping average and undesired braking can entail further disadvantages. Furthermore, fault instances of existing shaft generators can generally only be solved by shutting off the main engine and retrospective maintenance of the shaft generator, whereby the ship in question is disabled, which is to be avoided in particular at high seas.

Due to the descriptions given above, a demand exists to develop a shaft generator such that a flexible, inexpensive, simple and/or compact installation of a shaft generator and safe operation are possible, and in particular the option for retrofitting can be made available. The object of the invention is therefore to provide a shaft generator and an energy-generation and/or drive system having a shaft generator and a drive unit comprising a shaft in order to overcome the difficulties expounded above and to ensure in particular safe operation while requiring the least amount of space.

SUMMARY

This object is attained in a surprisingly simple yet effective manner by a shaft generator, an energy-generation and/or drive system having a shaft generator and a drive unit comprising a shaft and a corresponding ship.

According to the invention, a shaft generator for generating power during a generating process and/or for providing power during a motor operation is proposed, the shaft generator comprising a stator and a rotor, the rotor being configured to be disposed around a shaft of a drive unit, in particular bearing-free, and the stator being configured to be disposed around the rotor. The shaft generator according to the invention is characterized in that it comprises at least two frequency converters, the stator is separable into at least two stator segments and each of the at least two stator segments is assigned one of the at least two frequency converters.

The shaft generator according to the invention is based on the idea that a retrofitting of existing applications which do not yet have a shaft generator is possible by means of the divisibility and/or separability of the stator into at least two stator segments. Thus, it is possible to, for example, retrofit the shaft generator according to the invention in a ship without a shaft generator, without requiring a modification of the remaining drive shaft. A particularly efficient and quick installation of the shaft generator is thus ensured. The flexibility of the installation is also decisively increased. These actions have hitherto not been possible using conventional shaft generators. Equally, the shaft generator according to the invention is characterized in that it can be directly connected to a shaft of a drive unit, i.e., without having to interconnect a gear system, meaning a particularly compact design requiring little space is enabled, which can be retrofitted.

Equally, the shaft generator according to the invention bears the advantage that a simple and quick removal of the faulty component, e.g., a short circuit or a short-circuited coil in one of the stator segments, is possible in the event of a fault owing to their largely individual separability. This enables a particularly safe operation of the shaft generator. Particularly preferably, the at least two stator segments are designed so as to be reversibly separable and can be manually and/or (semi) automatically opened or separated in the event of a fault.

It appears advantageous if the at least two stator segments are automatically separated in the event of a fault, making a direct reaction to prevent consequential damage possible. This can take place via a robot control, for example. Particularly preferably, the at least two stator segments can each be displaced individually relative to the rotor after having been opened or separated in order to be decoupled from the rotor. Consequently, a fault event or failure (such as undesired blocking) can be removed immediately. The individual separability of the at least two stator segments makes it possible to continue operation of the shaft generator at part load, i.e., using the remaining stator segment, even after a fault event has occurred in one of the stator segments. A replacement of a faulty stator segment in retrospect is also possible, meaning the shaft generator has a particularly long service life. Moreover, the separability of the stator into the at least two stator segments makes it possible to reduce short-circuit currents and/or undesired braking moments, since the faulty component (i.e., stator segment) can be removed individually. The fault is then ended, without the drive unit having to be shut off for this purpose. In other words, the at least two stator segments increase the redundancy of the shaft generator according to the invention. The at least two stator segments can preferably be operated as separate electric systems. The separability of the at least two stator segments means that they can preferably be operated parallel to each other and independently of each other. In the event of a fault, the operation of the shaft generator can be maintained at part load. At the same time, the fault currents and/or a fault-based braking moment can be proportionately reduced as a result of the removal of a faulty segment.

A particular advantage of the shaft generator according to the invention is that the rotor can be positioned or disposed preferably bearing-free, i.e., without its own bearing, around any shaft of a drive unit. With respect to the state of the art, in which the rotor commonly has to be disposed around the shaft at great effort by means of its own bearing, this embodiment in particular bears the advantage that the rotor can be operated nearly maintenance-free. Therefore, no maintenance of an existing bearing is required.

Equally, the shaft generator according to the invention is characterized by a quick reaction time in the range of one to a few milliseconds and by a high degree of efficiency of >98%. A scale of >95% can be indicated as an overall degree of efficiency, i.e., a degree of efficiency starting from the provided mechanical shaft energy up to the energy conversion to electric energy at an outlet of the corresponding frequency converter.

The shaft generator according to the invention makes it possible to, for example, operate ships which have hitherto only been equipped with a purely combustion-engine-operated drive unit emission-free or at least at reduced emissions in a waters region regulated by emission protection, such as in coastal border zones, via a purely electromotive drive of the shaft or at least via a drive of the shaft supported in an electromotive manner by means of the shaft generator, which is then driven in a pure motor operation. The shaft generator according to the invention can preferably be used in the shipping sector for power take in (PTI) and power take off (PTO), i.e., during a motor operation (PTI) or during a generating process (PTO) depending on the required power. In PTI mode, preferably power units for providing (electric) energy for an on-board system of the ship can then be operated. A (possibly additional) mechanical power for operating the ship is provided directly at the propeller shaft by the shaft generator, which then acts as a shaft motor, in this mode. This allows, for example, an electrified boost (or thrust) operation when a ship enters a port or when maneuvering the ship in the port, without the combustion power of the combustion-based drive unit having to be increased. In PTO mode, in contrast, preferably the power units of the ship (commonly fueled with diesel oil) can be shut off. An electric power, which is necessary for operating the on-board system, can be provided emission-free by means of the shaft generator and, as applicable, by means of waste heat recovery from the drive unit.

The inclusion of the shaft generator according to the invention into an energy management system appears particularly preferable in order to enable a hybrid operation, comprising the shaft generator and a (for example combustion-based) drive unit.

The phrasing "at least two" describes that two or more components of the components in question can be present. Thus, the shaft generator can preferably comprise two frequency converters or more than two frequency converters. Likewise, the stator can comprise two stator segments or more than two stator segments. The phrasing is to be interpreted equivalently independently of the corresponding component.

The term "shaft generator" for generating power during a generating process and/or for providing power during a motor operation is to be understood in the application at hand as that the shaft generator according to the invention can be operated purely during a power generating process and purely during a motor operation, i.e., as a shaft motor. The term "shaft generator" in the present case comprises both the operation during power generating process and during a motor operation. The shaft generator is preferably configured in the manner of an electromagnetic machine, for example as a synchronous machine excited by a permanent magnet or as an externally excited synchronous machine. Generally, shaft generators can also be configured as other electromagnetic machines, for example as asynchronous machines, transverse flux machines, direct current machines or the like, a different electromagnetic construction being required in each instance. When the shaft generator is operated during a power generating process, a rotation of the shaft of a drive unit (not belonging to the shaft generator), for example a combustion motor of a ship, is used for providing electric power at the outlet of the corresponding frequency converter via electromagnetic power conversion. In this context, the rotor rotates owing to the externally excited rotation of the shaft in the stator and thus generates an electromagnetic rotation field having a definable electromagnetic power density. By means of the frequency converters, an electric outlet power stable in frequency can be provided and used by different users. When the shaft generator (i.e., the shaft motor) is operated during a motor operation, electromagnetic poles of the stator are supplied with electric power via the frequency converters. Via the rotating magnetic field within the stator thus excited, the rotor rotatable using the shaft is induced to rotate. Since the rotor is disposed around the shaft so as to be immovable with respect to the shaft, the shaft rotates together with the rotor and can thus operate a ship propeller, for example.

The phrasing "configured to be disposed around a shaft of a drive unit, in particular bearing-free" describes that the rotor can be positioned around an existing shaft preferably in retrospect. The rotor is preferably mounted in such a manner on a corresponding shaft that it cannot rotate with respect to the shaft, i.e., is connected in a fixed manner thereto (preferably in a reversibly detachable manner). Between the rotor and the shaft, in contrast to the state of the art, no bearing is provided. It is therefore particularly advantageous if the rotor can be disposed on an existing shaft around said shaft in a fixed manner.

The phrasing "the stator is configured to be disposed around the rotor" describes that the stator can be disposed around the rotor preferably without contact. The rotor is therefore preferably mounted around a shaft, and the stator is consequently disposed around the rotor in a fixed manner as concentrically as possible. The stator is not permanently, but reversibly disposed around the rotor owing to the separability into at least two stator segments after being positioned around the rotor. The stator segments can preferably be removed or separated individually from the rotor. Between an inner circumferential surface of the essentially hollow-cylinder-shaped stator and the essentially annular rotor, an air gap is present in the radial direction in this, preferably concentric, arrangement. The stator and the rotor therefore are preferably not in physical contact in this arrangement.

The term "rotor" in the present case is understood to be a rotating part of an electric machine, in the present case of the shaft generator. Alternatively, the rotor can also be referred to as an armature, moving component or rotating part. The rotor is generally surrounded by the immobile stator and only separated therefrom by a very slim air gap. The rotor can be cylindrical, for example, in some configurations. The rotor can comprise layered electrical steel sheets which are electrically insulated against each other. Distributed across a circumference of the rotor, grooves can be introduced in the electric steel sheets parallel to a rotational axis of the rotor, the grooves receiving what is known as rotor windings. From a desired number of pole pairs of the shaft generator, the number of rotor windings is determined, two rotor windings per pole pair being provided. Generally, the rotor can comprise permanent magnets (or permanent magnets which are permanently magnetized when produced) instead of rotor windings, via which one or more pole pairs are provided. Permanent magnets of this kind are commonly used in, for example, permanent magnet machines, which are part of the synchronous machines. An advantage in this context is the greater degree of efficiency, as no electrical energy is required during operation for producing the rotor magnetic field.

The term "stator" in the present case is understood as the immovable part of the shaft generator. Stators are often referred to as a stationary part. In the assembled state of the at least two stator segments, the stator is preferably shaped essentially like a hollow cylinder. Distributed across a circumference of the stator, several stator windings can be disposed parallel to a rotational axis of the rotor. In particular in the medium and high performance range, it is preferable for rod-shaped (wire) strands, mostly made of copper, to be used instead of individual windings in order to thus provide a corresponding flow section. The strands are each provided in the form of individual conductor loops insulated against each other. The strands can have a cross section in the centimeter range. The selected number of pole pairs of the shaft generator determines the number of stator windings.

The term "pole pair p" refers to the number of pairs of magnetic poles within rotating electric machines, consequently a multiple of two poles.

The term "frequency converter" refers to a power converter, which generates a different kind of alternating voltage (deviating in amplitude and/or frequency) from an alternating supply voltage. In doing so, an outlet frequency and an outlet amplitude can preferably be variable. Frequency converters, depending on their construction type, can be supplied by a single-phase alternating voltage, a three-phase alternating voltage or a direct voltage and can generate a three-phase alternating voltage having a predeterminable frequency therefrom.

By means of the shaft generator according to the invention, it is thus possible to ensure the consistent and safe operation thereof via a simple, quick and reliable removal of the faulty component and, in comparison to a ship operated only using a combustion engine, to attain significant emission savings. Simultaneously, a flexible, inexpensive, simple and/or compact installation of a shaft generator of this kind is enabled and a quick, simple and flexible retrofitting having a compact design requiring little installation space is made possible. In addition, it is possible to significantly reduce production and material costs as well as the gross weight owing in particular to the simple and compact construction type having a reduced number of components.

Further advantageous embodiments of the invention, which can be realized individually or in combination, are shown in the dependent claims.

In one embodiment of the invention at hand, it is conceivable for the rotor to be separable into at least two rotor segments. This embodiment is particularly advantageous with regard to retrofitting the shaft generator, as the rotor can be disposed around any shaft of any drive unit and/or be fixated there in a torque-proof manner in retrospect because of the separability into segments. This makes it possible to freely place the rotor on an existing shaft. An existing shaft therefore does not have to be specifically modified in order to be able to dispose a rotor thereon. An option of a reversible, torque-proof connection of the at least two rotor segments to a shaft can, for example, be provided via one or more clamping elements, screws or the like. Other types of reversibly detachable, torque-proof fastenings are also possible. Other non-reversible connections, such as welding, soldering or gluing, can generally at least be considered. However, in doing so, the rotor can no longer be reversibly detached from the shaft. The advantages and embodiments, which have been mentioned in connection with the at least two stator segments, correspondingly apply to the at least two rotor segments, without having to be explicitly mentioned.

In one embodiment of the invention at hand, it is conceivable for the at least two stator segments to each be configured to be displaced radially and/or axially. Thus, an electromagnetic decoupling of the segment in question is easily possible. The segment in question is spaced apart from the remaining components of the shaft generator via the displacement and no longer interacts electromagnetically with them. In one embodiment of the invention at hand, it is equally conceivable for the at least two rotor segments to each be configured to be displaced radially and/or axially. Thus, it is possible for a stator segment and/or a rotor segment to be separated individually and be displaced axially and/or radially with respect to the other stator segments and/or rotor segments. Radial displaceability means that the segment in question can be moved away translationally to a radial direction around the rotational axis of the rotor. An axial displacement means that the segment in question can be moved away translationally to the rotational axis of the rotor. Thus, a separation of the segment in question from the shaft generator is possible. In the event of a fault, a faulty segment, for example, can first be separated from the shaft generator and then be moved away therefrom in order to thus enable a complete decoupling from the electromagnetic system of the shaft generator. The segments in question can also be moved away in different directions. Moreover, it is generally conceivable for a corresponding segment to be able to be moved away perpendicular to a radial direction and/or perpendicular to an axial direction or along a curve trajectory. It should be noted that the term "segment" in the present case can refer to one or more stator segments and/or rotor segments equally.

The radial and/or axial displaceability can be ensured via a rail guide, for example, on which the at least two stator segments and/or the at least two rotor segments are disposed. Particularly preferably, the shaft generator therefore has at least one rail guide, on which the at least two stator segments and/or the at least two rotor segments are disposed so as to be displaceable relative to each other and can thus be displaced axially and/or radially with respect to each other. The at least two stator segments and/or the at least two rotor segments are displaceable preferably relative to each other in opposite directions along a preferably linear track (e.g., the rail guide). Other displacement systems, such as robot arms, crane guides or the like, on which the at least two stator segments and/or the at least two rotor segments are disposed in order to be displaced in this manner, are conceivable and, where applicable, advantageous.

In one embodiment of the invention at hand, it is conceivable for the at least two stator segments to each be configured to be operated independently of each other during a motor operation and/or during generating process by means of the corresponding frequency converter. The two stator segments therefore preferably each form autonomous systems operable independently of each other. Operation of the shaft generator can thus be continued using merely one half of the stator, for example, when the corresponding other half of the stator has a defect and has to be removed as a consequence. The part systems can be provided in particular by the individual stator segments each having stator windings with a completed number of pole pairs per stator segment. Thus, a corresponding stator segment can comprise 2, 4, 6, 8 or 10 pole windings (i.e., 1, 2, 3, 4 or 5 pole pairs), for example. The individual part systems can be provided by the shaft generator comprising at least two converters. In this context, each stator segment is assigned a frequency converter, meaning each stator segment on its own is operable via its own frequency converter.

In addition, it is particularly preferably possible for the corresponding converter in question to be used for fault detection in the stator segment in question. If the frequency converter in question detects a fault, for example in the form of a defect current, an automatic separation and moving away of the corresponding faulty stator segment can be initiated and/or a warning signal can be output, upon which a manual separation and moving away of the stator segment can take place.

In one embodiment of the invention at hand, it is conceivable for the stator to be separable into 4, 6, 8 or 10 stator segments and/or the rotor to be separable into 4, 6, 8 or 10 rotor segments. In other words, the stator and/or the rotor can be separated into more segments, meaning the stator and/or rotor can be configured so as to be separable into more than two part systems operable independently of each other. Preferably, the stator and/or the rotor each have a number of segments which corresponds to an even multiple of two. Generally, it is conceivable for the stator and the rotor to have a differing number of segments. Thus, for example, the stator can be divided into four segments, while the rotor is separable into two segments. Generally, it is also conceivable, provided it is possible from an electrical engineering point of view, for the stator and/or the rotor to also be dividable into 3, 5, 7, 9 or more uneven segments.

In one embodiment of the invention at hand, it is conceivable for the at least two stator segments and/or the at least two rotor segments to each be designed in the form of a hollow-cylinder segment. The term "hollow-cylinder segment" in the present case means that the corresponding segments have the shape of a hollow cylinder divided (axial) symmetrically along its longitudinal axis. In the event that the stator is separable into two parts, for example, a corresponding stator segment has the shape of a semi-shell of a hollow cylinder, for example. The stator and preferably also the rotor are preferably divided into segments in such a manner that the stator and preferably the rotor are separated along a cutting plane, which is spanned by the rotational axis of the rotor and the radial direction orthogonal thereto.

In one embodiment of the invention at hand, it is conceivable for each of the at least two frequency converters to be configured to operate the corresponding stator segment of the at least two stator segments during a motor operation and/or during a generating process. By means of the corresponding frequency converter, it is thus possible to control the shaft generator from −100% (corresponds to a pure motor operation) to over 0% (corresponds to engine idle of the shaft generator) up to +100% (corresponds to a pure generating process), preferably in a continuously variable manner. Owing to the corresponding frequency converter and the correspondingly assigned stator segment, a self-contained part system is formed. Via a part system of this kind, a generating process and a motor operation of the shaft generator can be enabled together with the rotor at least in part load.

In one embodiment of the invention at hand, it is conceivable for the shaft generator to have a power range of 500 kilowatts to 15,000 kilowatts. Generally, other power ranges are also conceivable. The shaft generator can therefore preferably provide 500 kilowatts to 15,000 kilowatts of electric power during a generating process or 500 kilowatts to 15,000 kilowatts of mechanical power during a motor operation, the mechanical power being made available at the shaft.

In one embodiment of the invention at hand, it is conceivable for an air gap in the size of 1 millimeter, 2 millimeters, 3 millimeters, 4 millimeters, 5 millimeters, 6 millimeters, 7 millimeters, 8 millimeters, 9 millimeters, 10 millimeters, 11 millimeters, 12 millimeters, 13 millimeters, 14 millimeters, 15 millimeters, 16 millimeters, 17 millimeters, 18 millimeters, 19 millimeters, 20 millimeters, 21 millimeters, 22 millimeters, 23 millimeters, 24 millimeters, 25 millimeters, 26 millimeters, 27 millimeters, 28 millimeters, 29 millimeters, to at least 30 millimeters to be present between the stator and the rotor in an operational state of the shaft generator. Owing to the missing bearing between the rotor and the shaft, the air gap of the shaft generator according to the invention is larger than an air gap from the state of the art, which predominately has a size of 1 millimeter to 1.5 millimeters. Despite the air gap being large in comparison to the state of the art, the electromagnetic losses are deemed negligible, meaning a high degree of efficiency of the shaft generator of >98% is still provided. In the scope of the invention, it has been realized that foregoing a bearing carries more advantages than there are efficiency disadvantages (due to larger magnetic losses) associated with an air gap consequently formed larger.

In one embodiment of the invention at hand, it is conceivable for the stator to have a diameter of at least 150 centimeters, 200 centimeters, 250 centimeters, 300 centimeters, 350 centimeters, 400 centimeters to at least 500 centimeters. Generally, an even larger configuration of the stator is also conceivable. For instance, the stator can have a diameter of 600 centimeters, 700 centimeters, 800 centimeters, 900 centimeters or more. It should be noted that in the present case all other intermediate sizes of the stator not explicitly stated are also included.

In one embodiment of the invention at hand, it is conceivable for the shaft generator to have a gross weight of 3,000 kilograms to 30,000 kilograms. Lighter or heavier configurations of the shaft generator are generally also conceivable. The weight depends in particular on a corresponding material selection underlying the expertise of the skilled person and the desired application of the shaft generator.

In one embodiment of the invention at hand, it is conceivable for the stator and the rotor and the at least two frequency converters to form components of an electric synchronous machine. The shaft generator is therefore preferably designed as a synchronous machine excited by permanent magnets or externally excited.

It is presumed that the definitions and details of the terms mentioned above pertain to all aspects described in this description and in the following, provided no other statements have been made to the contrary.

Also comprised by the invention is an energy-generation and/or drive system having a shaft generator according to the invention and having a drive unit comprising a shaft, the rotor being disposed around the shaft (preferably bearing-free), the stator being disposed around the rotor and the shaft being rotatable by means of the drive unit and/or the shaft generator. The shaft of a drive unit of this kind can, for example, have a length of up to 40 meters or more and can, for example, be disposed in a fuselage area of a ship.

Particularly preferably, shaft generators according to the invention or energy-generation and/or drive systems having shaft generators of this kind are used in the shipping sector, in particular on cargo ships, transport ships, naval vessels, cruise ships, yachts, tankships, research vessels. However, the application of the shaft generators according to the invention or the energy-generation and/or drive systems according to the invention having shaft generators of this kind is by no means limited to the shipping sector, but can generally be applied wherever a rotatable shaft of a drive system of any kind is used.

Furthermore, a ship having a shaft generator according to the invention and/or an energy-generation and/or drive system according to the invention, as described in detail elsewhere, is comprised by the invention.

BRIEF DESCRIPTION OF THE DRAWINGS

Further details, features and advantages of the invention can be taken from the following description of the preferred exemplary embodiments in connection with the dependent claims. The corresponding features can be realized individually or in any combination with each other. The invention is not limited to the exemplary embodiments. The exemplary embodiments are shown schematically in the figures. The same reference numerals in the individual figures refer to the same elements or elements being the same in function or corresponding to each other regarding their function.

DETAILED DESCRIPTION

Figure 1:
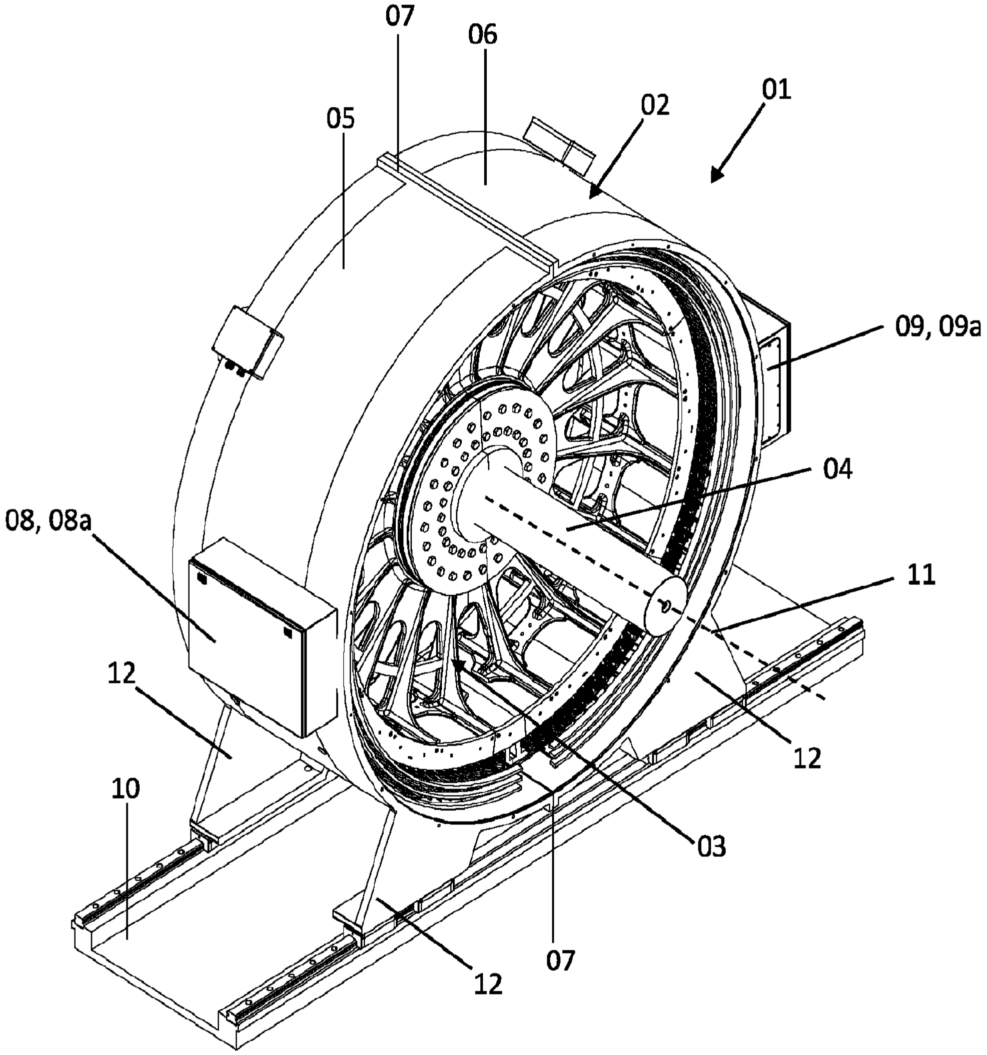
FIG. 1 shows a perspective view of a shaft generator and a shaft of a drive unit in an operational state.

FIG. 1 shows an exemplary embodiment of a shaft generator 01 according to the invention. Shaft generator 01 has a stator 02 and a rotor 03. Rotor 03 in the present case is fixedly disposed on a shaft 04 and/or connected in a torque-proof manner thereto in a bearing-free manner, i.e., without a bearing. Shaft 04 is, for example, a ship-propeller shaft which can be operated by a drive unit (not shown), such as a ship engine. Stator 02 is in the present case is disposed concentrically around rotor 03. Rotor 03 is separated from stator 02 contact-free via an air gap (not shown) and can rotate inside the stator 02.

According to the invention, stator 02 has at least two stator segments 05, 06. In the present case, stator 02 has a first stator segment 05 and a second stator segment 06. Stator segments 05, 06 are each semi-shells. Stator segments 05, 06 are separable from each other, stator segments 05, 06 being assembled so as to be reversibly detachable in the state shown in FIG. 1, meaning stator 02 essentially has the shape of a hollow cylinder in this state. Both stator segments 05, 06 can be connected to each other to form stator 02, for example via a reversible clamping or screw connection, which can be provided at tabs 07 of stator segments 05, 06, tabs 07 each being disposed at end faces. Tabs 07 in the present case are provided as radially protruding sections at corresponding end sections of stator segments 05, 06 (see also FIGS. 4 and 5). Other connections are generally also conceivable which ensure that stator segments 05, 06 are separable from each other, preferably individually, after being assembled to form stator 02.

Furthermore, shaft generator 01 comprises at least two frequency converters (not shown in FIG. 1 for better clarity), i.e., at least one first frequency converter 08 and one second frequency converter 09. In FIG. 1, merely first clamping box 08*a* for the connection of first frequency converter 08 and second clamping box 09*a* for the connection of second frequency converter 09 are shown. Each of the two stator segments 05, 06 is assigned one of the at least two frequency converters 08, 09. In the present case, first frequency converter 08 is assigned to first stator segment 05, i.e., electrically connected thereto. Second frequency converter 09 is assigned to second stator segment 06, i.e., electrically connected thereto. Corresponding frequency converters 08, 09 together with corresponding stator segments 05, 06 each form a self-contained electromagnetic active system, which can be operated independently of each other both during a generating process and during a motor operation in interaction with rotor 03.

Furthermore, shaft generator 01 has a rail guide 10, which is oriented orthogonally to a rotational axis 11 of rotor 03 and/or to rotational axis 11 of shaft 04. At each of the at least two stator segments 05, 06, a guide 12 is provided. Each guide 12 is fixedly connected to corresponding stator segment 05, 06 at one of their ends, for example welded thereto.

At the other end, each guide 12 engages in rail guide 10, so that guide 12 is movably disposed on rail guide 10. According to the invention, it is possible to separate each stator segment 05, 06 from a corresponding other stator segment. By means of rail guide 10, it is possible to move each separated stator segment 05, 06 individually away from rotor 03 in the radial direction.

Figure 2:
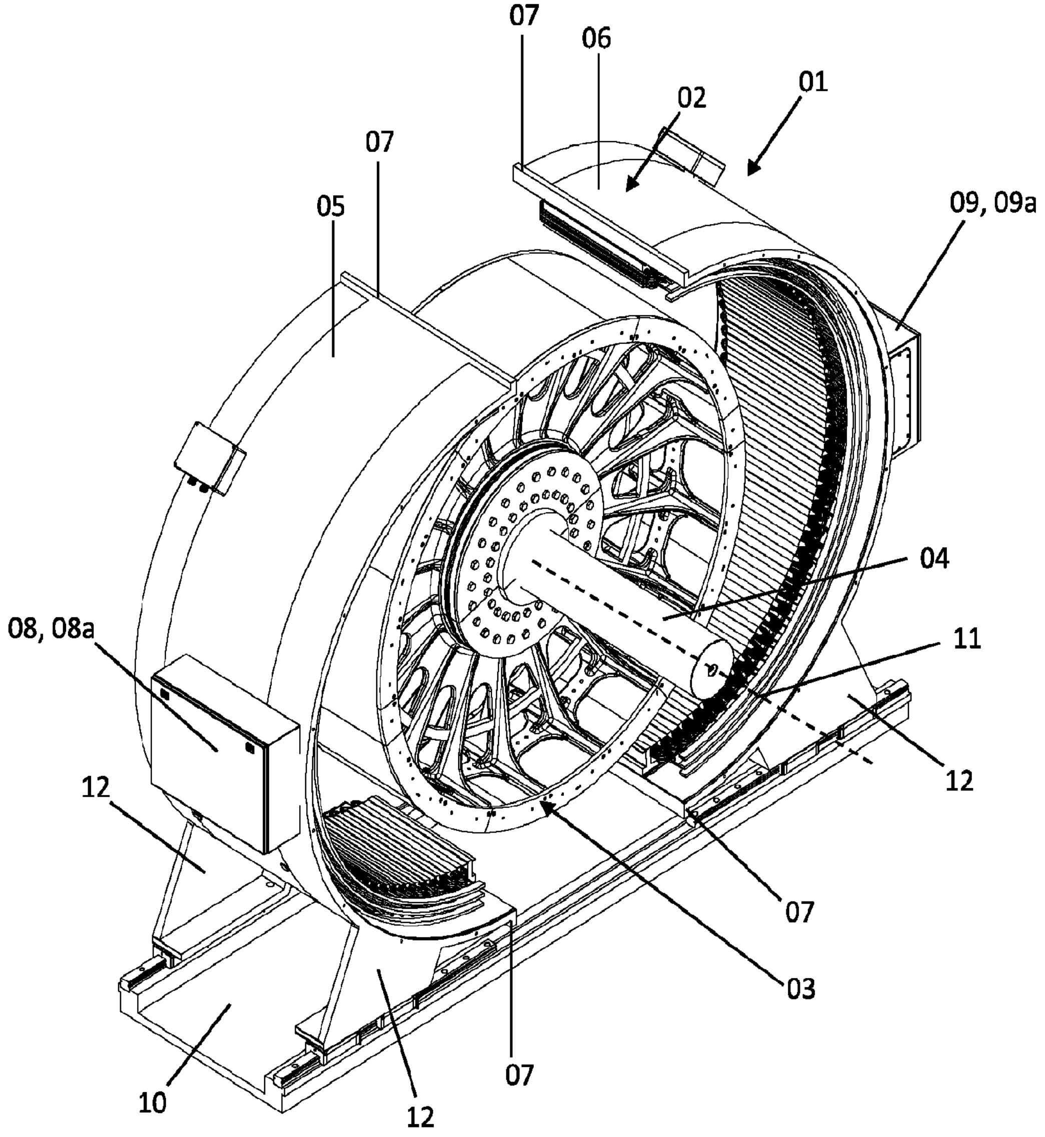
FIG. 2 shows a perspective view of a shaft generator having separated stator segments displaced radially with respect to each other.

In FIG. 2, for example, it is shown that both stator segments 05, 06 are each displaced away from rotor 03 along rail guide 10 in opposite radial directions to each other. Thus, stator segments 05, 06 are each electromagnetically decoupled from rotor 03. Upon a malfunction in one of stator segments 05, 06, it is consequently possible to effectively decouple them. Rotor 03 can thus continue to rotate with shaft 04, without an electromagnetic supply to the stator taking place, which could cause a fire hazard in the event of a fault.

Figure 3:
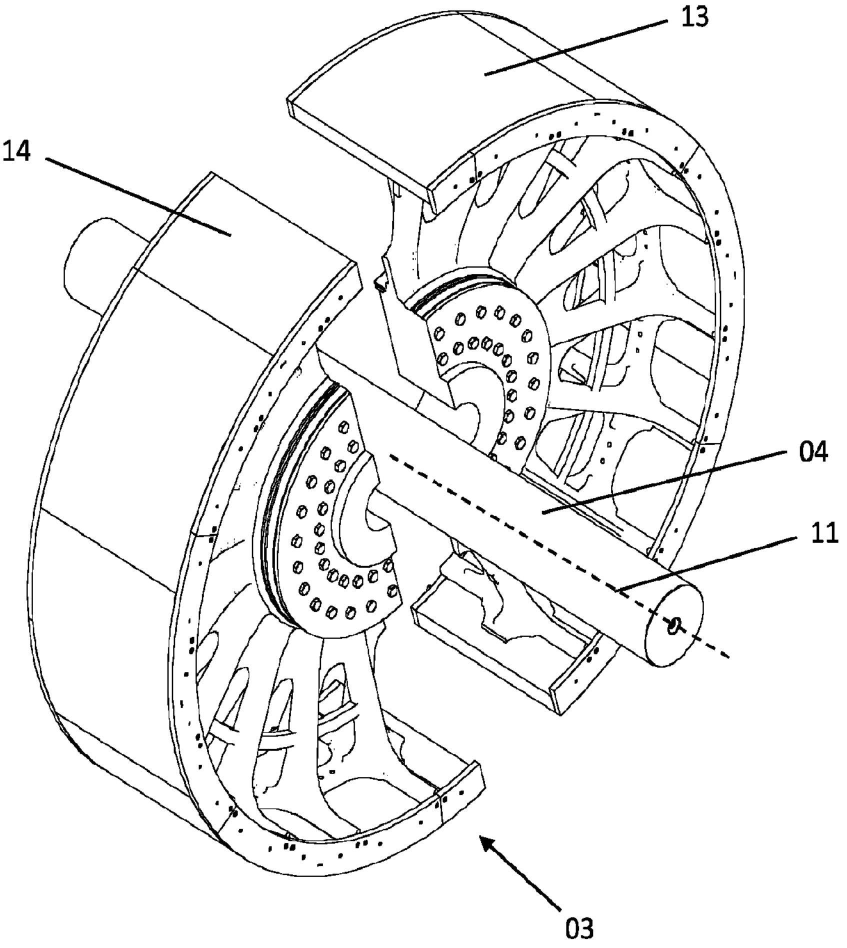
FIG. 3 shows a perspective view of separated rotor segments displaced radially with respect to each other, including a shaft of a drive unit.

In FIG. 3, rotor 03 is shown in an isolated view, i.e., without stator 02, albeit with shaft 04. As FIG. 3 shows, rotor 03 can be separated into at least two rotor segments 13, 14, as intended by the invention. In the present case, rotor 03 therefore has a first rotor segment 13 and a second rotor segment 14. Both rotor segments 13, 14 separate rotor 03 axial-symmetrically into two halves. Rotor 03 or rather rotor segments 13, 14 in the present case have permanent magnet poles each having alternating polarity, the permanent magnet poles being disposed along an outer circumference of corresponding rotor segment 13, 14, i.e., on a corresponding partial circumferential surface. In FIG. 3, no clearly delimited permanent magnet poles are drawn, but they are merely indicated schematically. Rotor 03 in the present case forms a part of a synchronous machine excited by permanent magnets. Rotor segments 13, 14 in the present case are each designed having a spoke-like interior. Rotor 03 is thus not designed as a contiguous circular disk, but rather has a shape more akin to a wheel rim having a plurality of recesses. These serve essentially to reduce weight and decrease an initial moment of inertia when starting rotor 03.

Figure 4:
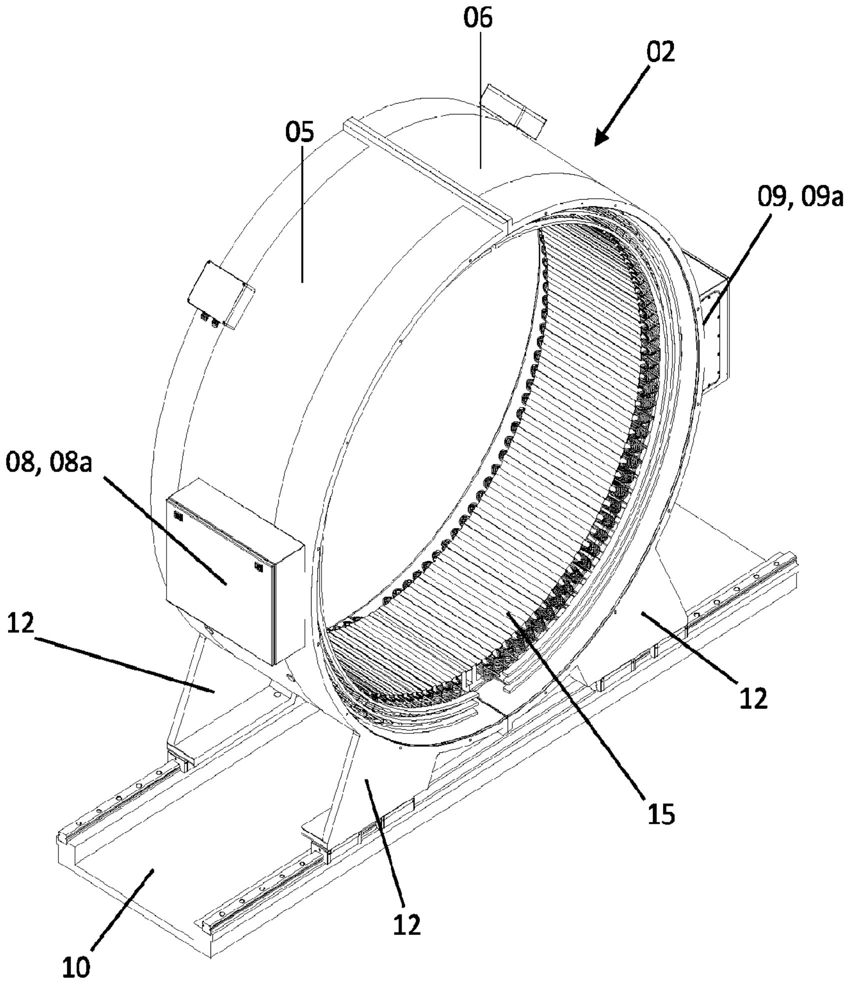
FIG. 4 shows a perspective view of two stator segments in a closed position.
Figure 5:
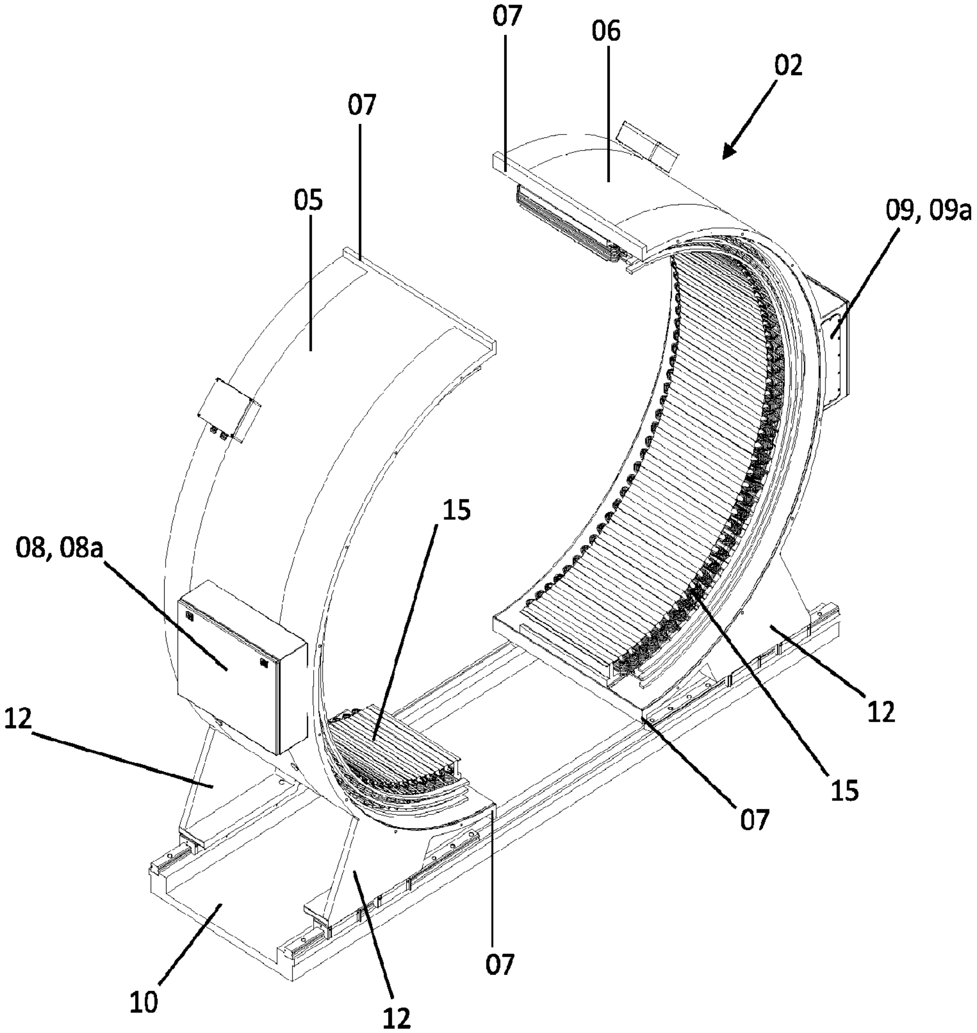
FIG. 5 shows a perspective view of separated stator segments displaced radially with respect to each other.

In FIGS. 4 and 5, stator 02 is shown in an isolated view again. In FIG. 4, stator 02 is shown in an assembled state, as previously shown in FIG. 1. In FIG. 5, stator 02 is shown in a state in which the at least two stator segments 05, 06 are separated from each other and are each moved away from each other in the radial direction along the rail guide. From the Figures, it can be seen that stator 02 comprises a plurality of stator windings 15, which are distributed along an inner circumferential surface of stator 02 so as to be isolated from each other. The number of stator windings 15 is determined by the number of pole pairs of shaft generator 01.

The invention claimed is:

1. A shaft generator (01) for generating power during a generating process and/or for providing power during a motor operation, the shaft generator (01) comprising a stator (02) and a rotor (03), the rotor (03) being configured to be disposed around a shaft (04) of a drive unit, in particular bearing-free, and the stator (02) being configured to be disposed around the rotor (03), characterized in that the shaft generator (01) comprises at least two frequency converters (08, 09), the stator (02) is separable into at least two stator segments (05, 06) and each of the at least two stator segments (05, 06) is assigned one of the at least two frequency converters (08, 09).

2. The shaft generator (01) according to claim 1, characterized in that the rotor (03) is separable into at least two rotor segments (13, 14).

3. The shaft generator (01) according to claim 1, characterized in that the at least two stator segments (05, 06) are each configured to be displaced radially and/or axially.

4. The shaft generator according to claim 2, characterized in that the at least two rotor segments (13, 14) are each configured to be displaced radially and/or axially.

5. The shaft generator (01) according to the claim 1, characterized in that the at least two stator segments (05, 06) are each configured to be operated independently of each other during a motor operation and/or during a generating process by means of the corresponding frequency converter (08, 09).

6. The shaft generator (01) according to claim 1, characterized in that the stator (02) is separable into 4, 6, 8 or 10 stator segments (05, 06) and/or the rotor (03) is separable into 4, 6, 8 or 10 rotor segments (13, 14).

7. The shaft generator (01) according to claim 1, characterized in that the at least two stator segments (05, 06) and/or the at least two rotor segments (13, 14) are each designed in the form of a hollow-cylinder segment.

8. The shaft generator (01) according to claim 1, characterized in that each of the at least two frequency converters (08, 09) is configured to operate the corresponding stator segment (05, 06) of the at least two stator segments (05, 06) during a motor operation and/or during a generating process.

9. The shaft generator (01) according to claim 1, characterized in that the shaft generator (01) has a power range of 500 kilowatts to 15,000 kilowatts.

10. The shaft generator according to claim 1, characterized in that an air gap in the size of 1 millimeter to 30 millimeters is present between the stator (02) and the rotor (03) in an operational state of the shaft generator (01).

11. The shaft generator (01) according to claim 1, characterized in that the stator (02) has a diameter of 150 centimeters to 500 centimeters.

12. The shaft generator (01) according to claim 1, characterized in that the shaft generator (01) has a gross weight of 3,000 kilograms to 30,000 kilograms.

13. The shaft generator (01) according to claim 1, characterized in that the stator (02) and the rotor (03) and the at least two frequency converters (08, 09) form components of an electric synchronous machine.

14. An energy-generation and/or drive system having a shaft generator (01) according to claim 1 and having a drive unit comprising a shaft (04), the rotor (03) being disposed around the shaft (04), the stator (02) being disposed around the rotor (03) and the shaft (04) being rotatable by means of the drive unit and/or the shaft generator (01).

15. A ship having a shaft generator (01) according to claim 1 or an energy-generation and/or drive system.

* * * * *